Sept. 21, 1954                M. WAGNER                    2,689,746
              VEHICLE WHEEL SUSPENSION, INCLUDING
              MEANS TO ADJUST THE WHEEL CARRIER
                     Filed May 5, 1950
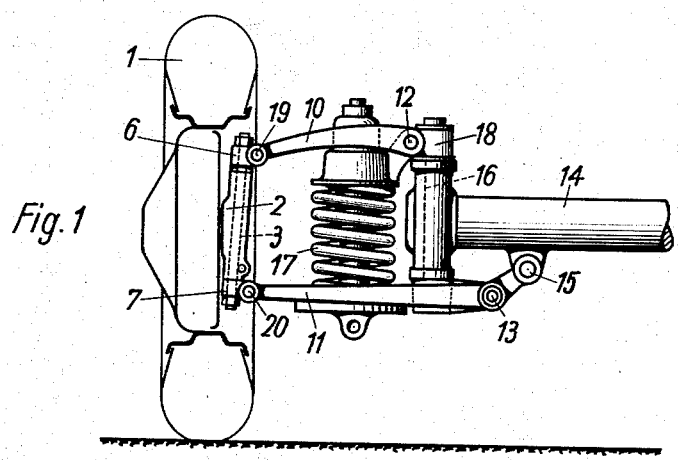
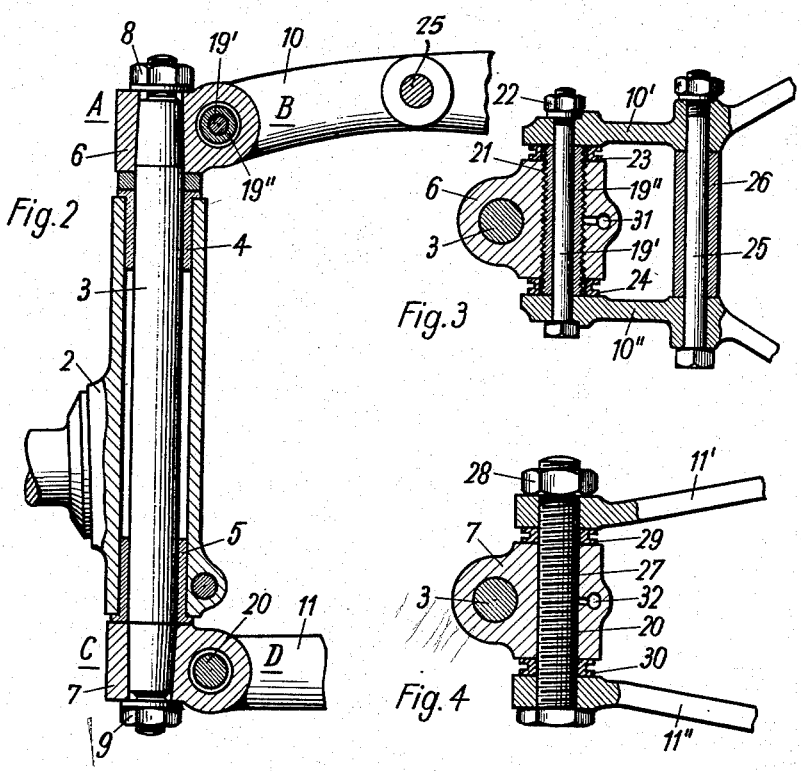
INVENTOR.
Max Wagner
BY
Hazeltine, Lake & Co.
AGENTS Patented Sept. 21, 1954

2,689,746

UNITED STATES PATENT OFFICE 2,689,746

VEHICLE WHEEL SUSPENSION, INCLUDING MEANS TO ADJUST THE WHEEL CARRIER

Max Wagner, Stuttgart, Germany, assignor to Daimler-Benz Aktiengesellschaft, Stuttgart-Unterturkheim, Germany Application May 5, 1950, Serial No. 160,326

Claims priority, application Germany May 9, 1949

3 Claims. (Cl. 280—96.2)

This invention relates to a vehicle wheel suspension and more especially it relates to the suspension of a steerable wheel of a motor vehicle particularly by means of two links arranged in superposition.

The principal object of the invention is to provide means for conveniently taking up the forces occurring in the joints between wheel carrier or swivel pin, and link and an easy and exact assembly of the parts to be connected by joints. For this purpose in particular threads are used serving as an articulated mounting in which the swinging motion takes place. The threads in the joint of the upper link and in the joint of the lower link are conveniently different.

Further advantages and details of the present invention will be apparent from the following description of an example of construction and from the appended claims forming part of the subject-matter of the invention.

In the drawings:

Fig. 1 is a front elevation of the wheel suspension.

Fig. 2 is a section taken through the swivel pin axis and the connection of the swivel pin with the guide links, and showing an optional additional feature.

Fig. 3 is a section on the line A—B, and

Fig. 4 is a section on the line C—D of Fig. 2.

The steerable front wheel 1 is carried by the wheel carrier 2 which is mounted on the swivel pin 3 by means of two bearings 4 and 5 and to which steering motion is imparted in any suitable manner. The cone-shaped ends of the swivel pin 3 which does not participate in the steering motion have located thereon the joint pieces 6, 7 tightened by the nuts 8 and 9.

The wheel is guided by the links 10 and 11 arranged in superposition each being built up of two separate link arms 10', 10" (Fig. 3) and 11', 11" (Fig. 4) and hingedly connected by means of pivots 12 and 13 with an upright supporting member or supporting pivot 16 which is, for instance resiliently mounted on the vehicle frame 14 and yieldably supported thereon against rotational movement by buffers 15. Springing of the wheel is performed by a helical spring 17 which— like the shock absorber surrounded by the same— abuts with its lower end against the lower link and with its upper end against a joint piece 18 of the upright supporting pivot 16 simultaneously supporting the joint 12.

The two arms 10', 10" and 11', 11" of each of the two guide links 10 and 11 embrace on both sides the corresponding joint pieces 6 and 7 and have connection therewith by means of pivot pins 19 and 20.

The pivot pin 19 connecting the upper link to the joint piece 6 is a two-piece member and composed of an internal hinge bolt 19' and a bush 19" arranged concentrically thereto, said bush having an external thread 21 serving to provide a pivotal mounting between the pivot pin and the joint piece 6 and cooperating with a corresponding internal thread of said joint piece. The bush 19", in this case, simultaneously acts as a distance sleeve by having a length corresponding to the distance of the arms 10' and 10" from each other and is tightly pressed against the link arms, e. g. by the bolt of the pivot pin, by means of the nut 22. The hub of the joint piece 6 provided with an internal thread 21 is of shorter length than the threaded bush 19" so that intermediate spaces are formed between the hub and the link arms to accommodate packing rings 23 and 24 of elastic material (such as rubber) which may be placed under stress. At a certain distance from the pivot pin 19 the link arms 10' and 10" may be braced together such as by a further cross-bolt 25 with distance sleeve 26, shown only in Figs. 2 and 3.

A corresponding articulated connection is provided between the lower joint piece 7 and the lower link 11 and the link arms 11', 11". In this case, however, connection is provided by the single-piece pivot pin 20 simultaneously serving as a bearing bolt and being provided throughout its length with an external thread 27. By means of this thread the pivot pin 20 is screwed both through the ends of the link arms 11", 11' provided with a corresponding internal thread and through the bore in the joint piece 7 likewise provided with a corresponding internal thread. A nut 28 serves to secure the pivot pin 20 in the ends of the link arms 11', 11". The distance between the two link arms may be ensured by a collar on the pivot pin 20 against which the nut 28 is screwed, distance sleeves corresponding to the sleeve 26, the lower spring plate of the spring 17, corresponding means in the bearing joint 13 or in any other suitable manner. The pivot pin 20 may be made in two pieces like the pivot pin 19.

Between the frontal areas of the joint piece 7 and the ends of the link arms again rubber rings 29 and 30 are interposed. Bores 31 and 32 serve for the admission of a lubricant to the threads 21 and 27 which may be supplied by separate lubricating devices or, for instance, from a centralized chassis lubrication.

Assembly of the guide links 10, 11 and the swivel pin 3 is performed conveniently so that primarily the connection of the lower link and thereupon the connection of the upper link is made without giving rise to a binding action and without altering the predetermined caster angle. The thread 27 preferably has clearance fit within the joint piece 7 whilst it fits snugly in the link arms 11', 11''.

In a similar manner as the pivot pins 19 and 20, the bearings 12 and 13 may be provided with a corresponding bearing thread for mounting the two links on the upright supporting member 16.

Although a specific embodiment of the invention has been shown and described, it is to be understood, of course, that modifications may be made therein without departing from the scope and the spirit of this invention as defined in the appended claims.

What I claim is:

1. In a vehicle wheel suspension for providing a connection between a vehicle body and a wheel carrier assembly, a pair of guide links each having a pair of arms integrally formed therewith and arranged in superposed relationship to guide the wheel carrier assembly relative to the vehicle body, means for connecting said guide links to the vehicle body for relative pivotal movement about substantially horizontal axes, means for connecting one pair of said arms of one of said guide links to the wheel carrier assembly for relative pivotal movement comprising threaded pivot pin means and counter-threaded means in only one of the two parts consisting of said one pair and said wheel carrier assembly co-operating with said pivot pin means to provide threaded pivotal movement between said two parts within the confines of the thread on said pivot pin means and said counter-threaded means, said pivot pin means non-threadably engaging the other of said two parts, means for connecting the other pair of said arms of the other guide link to the wheel carrier assembly for relative pivotal movement comprising a threaded pivot pin, and counter-threaded bores in said other pair and in said wheel carrier assembly, said pivot pin extending into both counter-threaded bores to establish screw-type connections therewith and to provide pivotal movement within the confines of at least one screw-type connection, and resilient annular means for sealing each co-operating thread and counter-thread at the ends of the ranges of action thereof.

2. A vehicle wheel suspension as in claim 1 wherein the pivot pin means of the means for connecting said one pair of arms to the wheel carrier assembly comprises an externally threaded bushing cooperating with the counter-threaded means of one of said two parts, and an internal bolt member connected to the other of said two parts.

3. A vehicle wheel suspension as in claim 1 comprising spring means for springing the wheel carrier assembly relatively to the vehicle body positioned to exert spring forces substantially on only one of said guide links, the other of said guide links being substantially free of spring loading.

References Cited in the file of this patent

UNITED STATES PATENTS

| Number | Name | Date |
| --- | --- | --- |
| 2,092,611 | Olley | Sept. 7, 1937 |
| 2,254,282 | Griswold | Sept. 2, 1941 |
| 2,339,533 | Wahlberg et al. | Jan. 18, 1944 |
| 2,351,651 | Wulff | June 20, 1944 |

FOREIGN PATENTS

| Number | Country | Date |
| --- | --- | --- |
| 252,016 | Great Britain | May 7, 1926 |
| 425,154 | Great Britain | Mar. 7, 1935 |